United States Patent [19]

Matuoka

[11] Patent Number: 4,494,421
[45] Date of Patent: Jan. 22, 1985

[54] WINDSHIELD WIPER DRIVING DEVICE

[75] Inventor: Hirosi Matuoka, Nagoya, Japan

[73] Assignee: Nippondenso Co., Ltd., Kariya, Japan

[21] Appl. No.: 360,772

[22] Filed: Mar. 22, 1982

[30] Foreign Application Priority Data

Mar. 31, 1981 [JP] Japan .................... 56-49161

[51] Int. Cl.³ .............................. B60S 1/08
[52] U.S. Cl. ..................... 74/600; 15/250.17
[58] Field of Search ............ 15/250.16, 250.17; 74/600, 570, 828

[56] References Cited

U.S. PATENT DOCUMENTS

| 2,739,681 | 3/1956 | Bowers et al. | 15/250.16 |
| 3,115,599 | 12/1963 | Ziegler | 74/600 |
| 3,665,772 | 5/1972 | Beard et al. | 15/250.16 X |
| 3,717,048 | 2/1973 | Carpenter | 15/250.17 X |
| 3,800,624 | 4/1974 | Klement et al. | 15/250.17 X |
| 4,400,844 | 8/1983 | Hayakawa et al. | 74/75 X |

FOREIGN PATENT DOCUMENTS

| 2900166 | 7/1979 | Fed. Rep. of Germany | 15/250.16 |
| 42-10969 | 6/1967 | Japan . | |
| 44-17930 | 8/1969 | Japan . | |

Primary Examiner—Kenneth J. Dorner
Attorney, Agent, or Firm—Cushman, Darby & Cushman

[57] ABSTRACT

A link rod for driving wiper blades is coupled to and driven by a crank arm by means of an eccentric bush, so that an effective length of the link rod can be changed. A stopper portion is provided on the link rod for maintaining, during a normal operation, the eccentric bush in such a position where the effective length is smallest. A driving mechanism including three gears meshing with each other drives the eccentric bush when a wiping operation should be stopped so that the eccentric bush is rotated and placed at a position where the effective length of the link rod becomes largest, whereby the wiper blades are held in concealed positions during the blades are out of operation.

3 Claims, 11 Drawing Figures

WINDSHIELD WIPER DRIVING DEVICE

BACKGROUND OF THE INVENTION

The present invention relates to a windshield wiper driving device for wiping the surface of a window and, more particularly, to a concealed or semi-concealed type window wiper driving device having a function to partially conceal a wiper blade from view when it is stopped.

According to one example of the constructions known in the prior art, as is disclosed in Japanese Utility Model Publication No. 42-10969, the output shaft of a drive motor is made to perform an eccentric motion when in the concealing operation so that a connecting lever is moved with a stroke longer than the usual stroke. In another example disclosed in Japanese Utility Model Publication No. 44-17930, a reversible drive motor is used, and an eccentric bearing is arranged at a portion jointing a connecting lever and a crank arm at the side of the drive motor so that the substantial length of the connecting lever may be changed in accordance with the forward and backward rotations of the eccentric bearing.

However, the former construction has defects: that, in order to make eccentric the output shaft of the drive motor, the transmission of the driving force is once released to effect one half rotation of the eccentric bearing, while fixing the position of a crank arm, so that the front shield cannot be instantly wiped clean, when the switch is turned on with the wiper blade being left stopped; and that its internal construction is so complex that its production cost is necessarily raised.

On the other hand, the latter construction can be appreciated in its high simplicity at the eccentric bearing jointing the connecting lever and the crank arm but still has defects: that it is necessary at present in a permanent magnet type motor to use a plurality of relays for effecting the forward and backward rotations and to give a special construction to a device for effecting the stop at a fixed position, thus inviting a disadvantage in the production cost; and that the upwardly reversed position of the blade before it is concealed is located inside of the usual wiping range so that the shield has its surface left blotted, thus deteriorating the view after the wiper is stopped.

SUMMARY OF THE INVENTION

The present invention is therefore intended to eliminate the defects thus far described and has an object to provide a window wiper drive equipment which is enabled to instantly wipe clean a window when its switch is turned on, to have a simplified construction and to have such a concealing function as to provide an excellent view after the wiper is stopped.

DETAILED DESCRIPTION OF THE PREFERRED EMBODIMENT

One embodiment of the present invention will now be described in the following.

Figure 1:
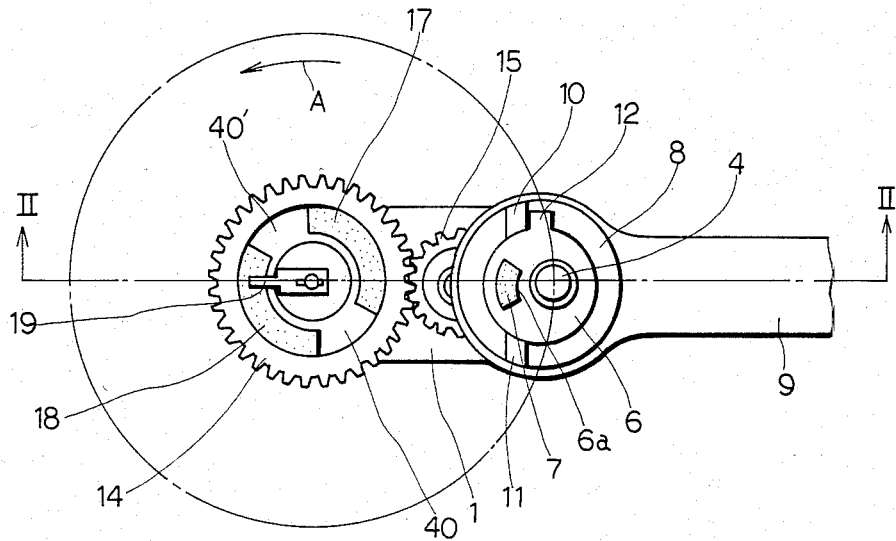
FIG. 1 is a top plan view showing a portion of one embodiment of the present invention.
Figure 2:
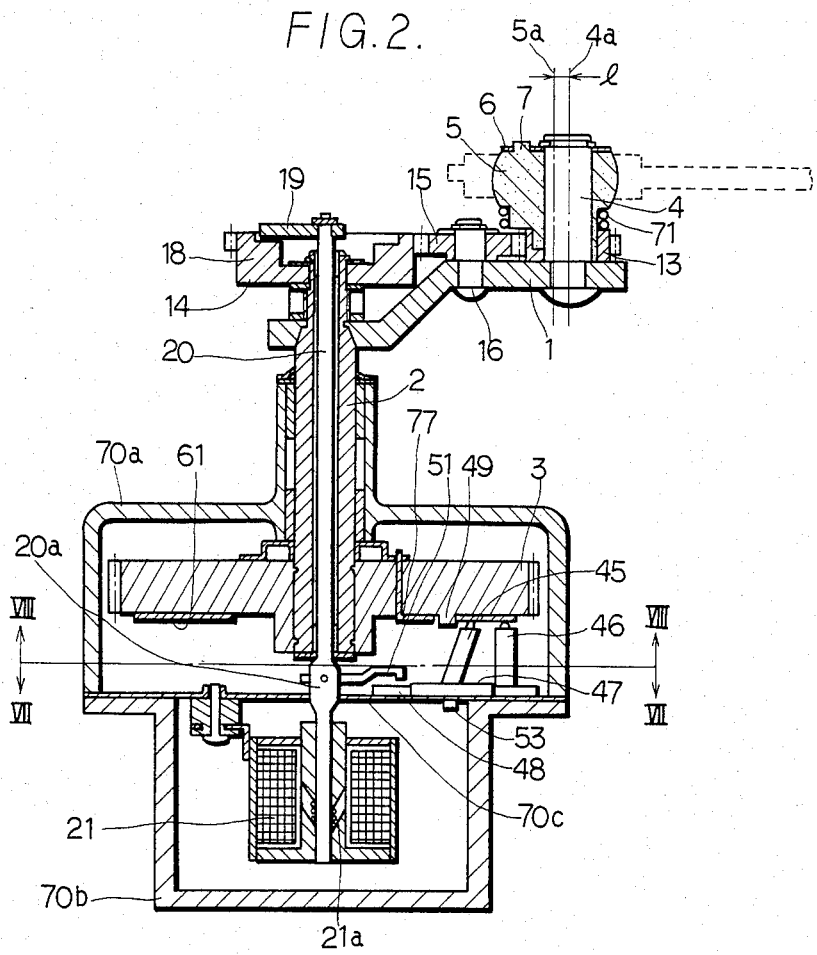
FIG. 2 is a cross-sectional view taken along a line II—II in FIG. 1.
Figure 8:
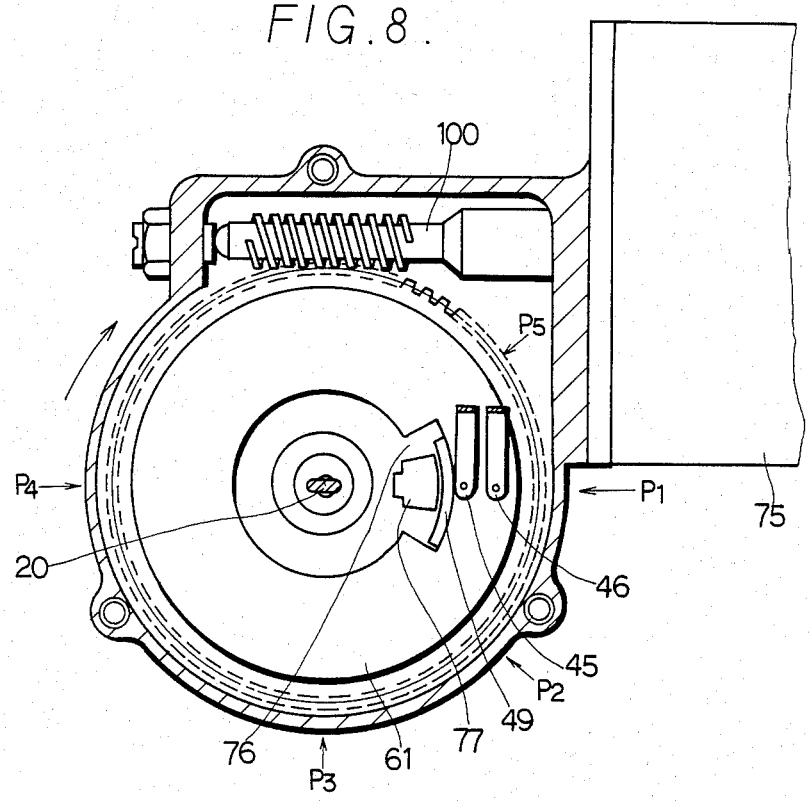

In FIGS. 1 and 2, reference numeral 1 indicates a crank arm which is fixed to a drive shaft 2. This drive shaft 2 is formed into a hollow shaft, which is rotatably fitted in a housing 70a by means of a bearing while having its axial movement restricted by suitable means. Moreover, the drive shaft 2 is fixed to a worm gear 3, which is made to mesh with a worm 100 (as shown in FIG. 8) connected to the output shaft of a motor 75 (as shown in FIG. 8) so that it transmits the rotations of the motor 75 to the drive shaft 2. In the embodiment being described, the worm gear 3 is molded of a resin. Numeral 4 indicates a pin which is fixed by clamping or the like to the leading end of the crank arm 1 and on which there is eccentrically rotatably fitted a bush 5. The distance between the center line 4a of the pin 4 and the center line 5a of the bush 5 has a length 1, as designated in FIG. 2. Numeral 6 indicates a stopper plate which is placed on the upper side of the eccentric bush 5, and an axial projection 7 molded integrally with the eccentric bush 5 engages with an opening 6a formed in the stopper plate 6 so that the stopper plate 6 and the eccentric bush 5 may rotate together. The stopper plate 6 is further formed with a radially extending projection 12.

On the eccentric bush 5, there is rotatably retained a ring 8 made of a synthetic resin, which is fixed to the leading end of a link rod 9. Moreover, the ring 8 has its upper side molded integrally with two facing stopper portions 10 and 11 thereby to block the rotations of the eccentric bush 5 when the projection 12 of the stopper plate 6 is brought to abut against either of the stoppers 10 and 11. In case the projection 12 is in abutting engagement with the stopper portion 10, as shown in FIG. 1, the center of the eccentric shaft is dislocated at the left of the center of the pin 4.

At the side of the eccentric bush 5 opposite to the stopper plate 6, i.e., at the bottom side of the eccentric bush 5, as viewed in FIG. 2, an external gear (or a first gear) 13 is rotatably fitted on the pin 4. Between that external gear 13 and the stepped portion of the eccentric bush 5, there is sandwiched a helical spring 7a which is made operative to thrust the external gear 13 to the crank arm 1 and to impart a higher frictional resistance to the clockwise rotations of the bush 5. This bush 5 and the external gear 13 are fixed to each other so that they can rotate together.

Reference numeral 14 indicates a sun or center gear (or a third gear) which is rotatably fitted on the drive shaft 2. Numeral 15 indicates a planetary gear (or a second gear) which is rotatably fitted on a pin 16 anchored at the crank arm 1 and which is made to mesh with both the external gear 13 and the center gear 14. In the embodiment being described, incidentally, the gear ratios of the first, second and third gears 13, 15 and 14 are set at 1:1:2. The center gear 14 is formed into such a cup shape as to have its bottom protruding into a pair of diametrically opposite stopper portions 17 and 18 having an arcuate shape. These stopper portions 17 and 18 are made to have an arcuate length of about 120 degrees while forming spaces 40 and 40' therebetween.

Reference numeral 20 indicates a trigger shaft which is positioned to extend through the hollow drive shaft 2 and which has its upper end carrying a lever 19 and its lower end connected to drive means 21 having an electromagnetic solenoid. When this electromagnetic solenoid has its coil energized, the trigger shaft 20 is attracted downwardly of the drawing by the electromagnetic force thereof. FIG. 2 shows the state at which the coil is left deenergized so that the trigger shaft 20 is raised by the action of a spring 21a. Since, at this state, the lever 19 is free from contact with both the stopper portions 17 and 18, the center gear 14 can freely rotate around the drive shaft 2. The electromagnetic solenoid 21 is fixed to a housing partition 70c by the use of suitable means and is disposed in a housing 70b. A flattened portion 20a formed at a middle portion of the trigger shaft 20 is positioned to extend through a slot formed in the center of the housing partition 70c so that the rotations of the trigger shaft 20 relative to the housing 70 are blocked by the engagement between those flattened portion and slot.

Figure 7:
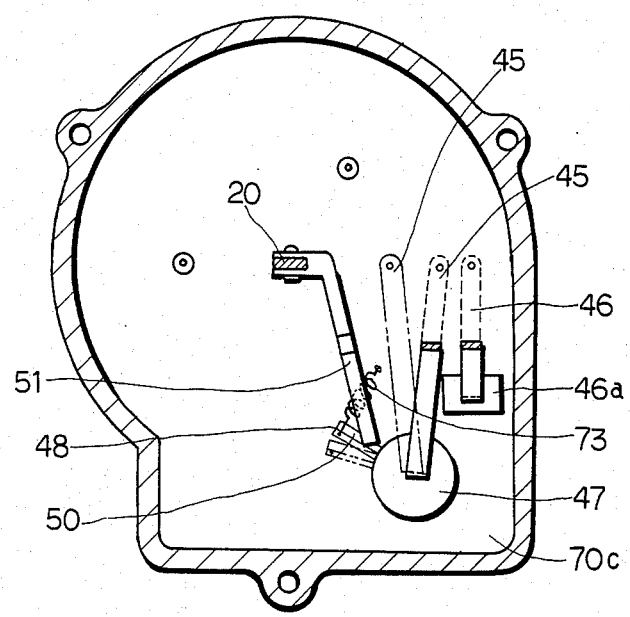
FIGS. 7 and 8 are cross-sectional views taken along the lines VII and VIII in FIG. 2; and, FIGS. 9 to 11 are explanatory views schematically illustrating the operations of the gear mechanism for explaining the operations of the embodiment.

Next, a switching mechanism will be described with reference to FIGS. 2, 7 and 8. A generally annular conducting plate 61 made of a conductive substance is fixed to the bottom side of the worm gear 3 by the use of suitable means such as an adhesive so that it can rotate together with the worm gear 3. As better seen from FIG. 8, the annular conducting plate 61 has its inner circumferential portion formed with an opening 76 having an open angle of about 45 degrees, in which protrudes downwardly an arcuate projection 49 formed integrally with the worm gear 3. At that opening 76, moreover, there is fixed to the worm gear 3 another conducting plate 77 which is grounded to the earth while being electrically insulated from the first conducting plate 61. Numerals 45 and 46 indicate a pair of brushes which have their respective ends siding on the conducting plate 61. The brush 45 is held above the housing partition 70c by means of a supporting plate 47 so that it can rotate together with the supporting plate 47 around the center pin 53 of the latter. The other brush 46 is fixed to the housing partition 70c through a supporting plate 46a. To the former supporting plate 47, there is jointed a cam lever 48 which is so shaped to extend radially of the disc-shaped supporting plate 47 as to have its leading end joined to one end of a spring 73. The other end of this spring 73 is fixed at a suitable position of the housing partition 70c thereby to bias both the supporting plate 47 and the cam lever 48 in the clockwise direction in FIG. 7 (as is designated at solid lines). The cam lever 48 is formed with such a slope 50 as to provide a cam surface.

To the flattened portion 20a of the trigger shaft 20, there is fixed a trigger lever 51 which is carried down by the trigger shaft 20 when this shaft 20 is attracted downwardly in FIG. 2 by the action of the electromagnetic solenoid 21. The leading end of the trigger lever 51 is in abutting contact with the cam surface of the cam lever 48, which is rotated counter-clockwise in FIG. 7, when the trigger lever 51 is moved down, by the cam action until it is shifted together with the brush 45 to such positions as designated at double-dotted lines in FIG. 7.

Figure 4:
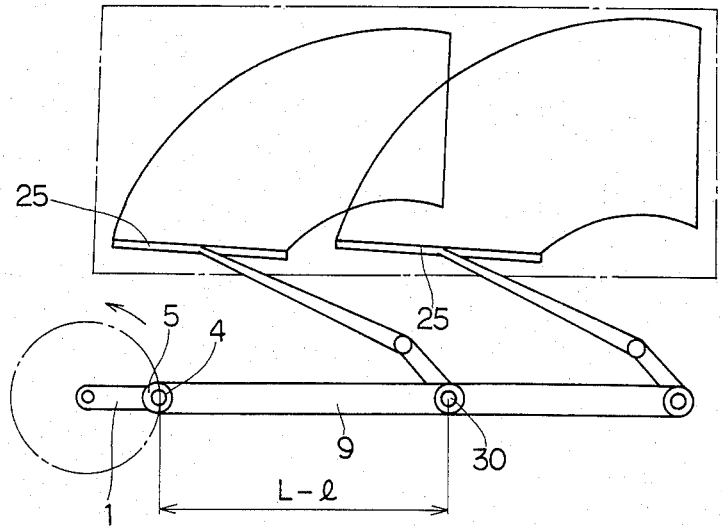
FIGS. 4 and 5 are views illustrating the whole construction of the link mechanism of the above embodiment during the usual and concealing operations, respectively.

FIG. 4 shows a wiper link mechanism, in which the link rod 9 is connected to the wiper link by means of a pivot pin 30 so that wiper blades 25 can perform the known wiping operation.

Figure 5:
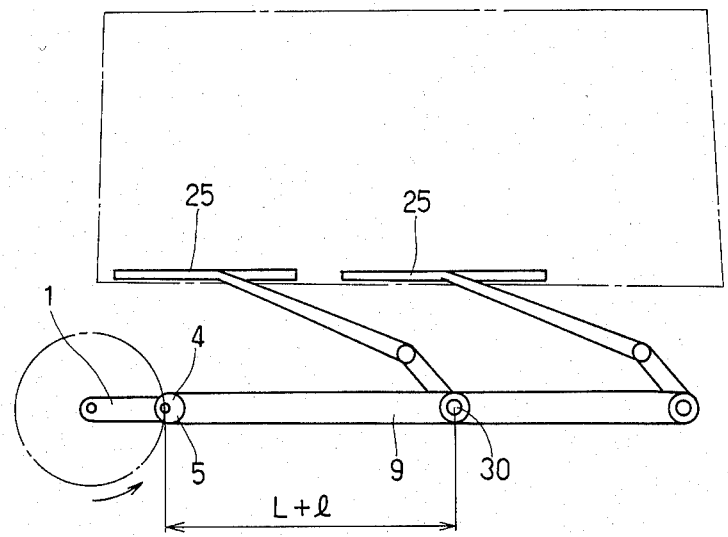

FIG. 5 shows the state at which the window wiper drive equipment is stopped so that the wiper blades 25 are in their concealed position.

Figure 6:
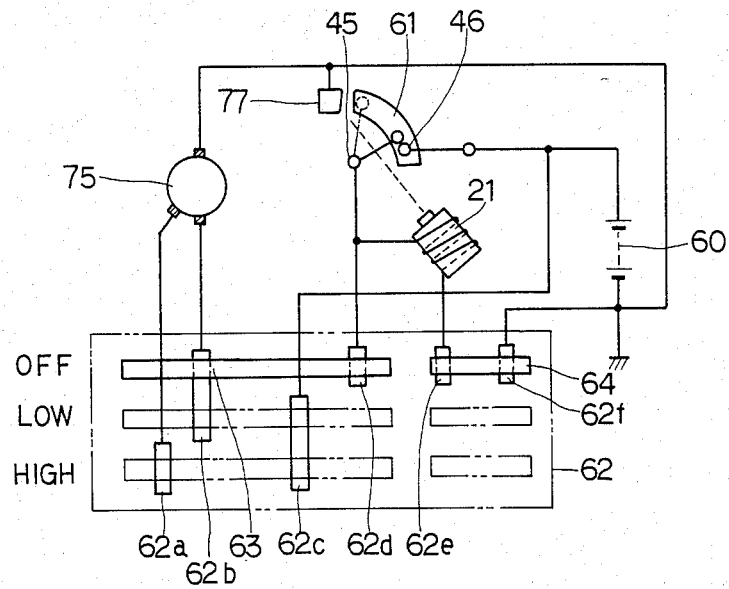
FIG. 6 is a diaphragm showing an electric circuit for the above embodiment.

FIG. 6 shows the electric circuit of the wiper drive equipment, in which reference numerals 60 and 62 indicate a battery and an operating switch, respectively. The latter operating switch 62 is made to have three operation levels, i.e., "OFF", "LOW" and "HIGH", as is well known in the art, and to include stationary electrodes 62a to 62f and movable electrodes 63 and 64. On the other hand, the battery 60 has its anode connected not only with the conducting plate 61 by way of the brush 46 but also with the stationary electrode 62c. The cathode of the battery 60 is grounded to the earth and connected with both the stationary electrode 62f and the minus terminal of the electric motor 75. The other terminal of this motor 75 is connected with the two stationary electrodes 62a and 62b. The stationary electrode 62d is connected with both one terminal of the electromagnetic solenoid 21 and the brush 45. The other terminal of the electromagnetic solenoid 21 is connected with the stationary electrode 62e. The conducting plate 77 is so grounded to the earth as is shown in FIG. 6.

Figure 9:
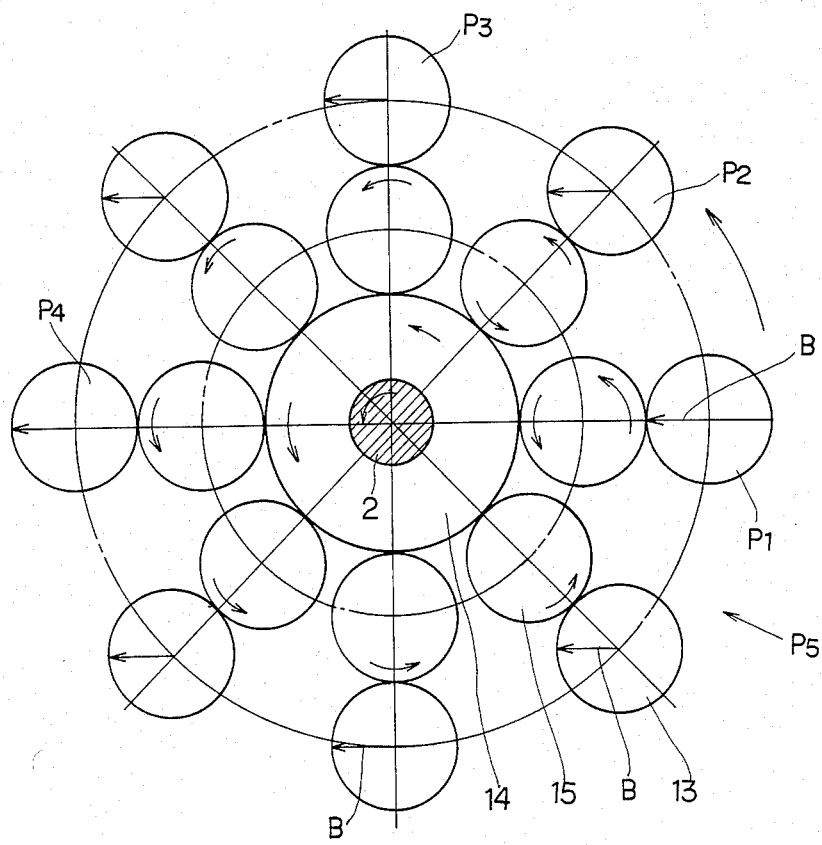

The operations of the wiper drive equipment having the construction thus far described will be explained in the following. When the operating switch 62 is at the operation level "LOW" or "HIGH", the motor 75 is energized through the stationary electrode 62c, the movable electrode 63 and the stationary electrode 62b or 62a thereby to rotate the crank arm 1 counter-clockwise, as indicated at arrow A in FIG. 1. Since, at this time, the movable electrode 64 contacts neither of the stationary electrodes 62e and 62f, the electromagnetic solenoid 21 is supplied with no electric power so that the trigger shaft 20 is left at its raised position, as shown in FIG. 2. As a result, the lever 19 does not engage with the stopper portions 17 and 18 so that the center gear 14 is allowed to freely rotate about the drive shaft 2. Since the eccentric bush 5 is fixed on the external gear 13 and since a frictional force is established between the external gear 13 and the crank arm 1 by the action of the helical spring 71, the eccentric bush 5 and the crank arm 1 are likely not to move relative to each other by that frictional force. However, since the eccentric bush 5 is connected to the link rod 9 and since the projection 12 of the stopper plate 6 fixed on the eccentric bush 5 is in abutting engagement with the stopper portion 10 of the ring 8, the eccentric bush 5 is held irrespective of the rotation of the crank arm 1 in the direction of the arrow A at the state of FIG. 1, in which the projection 12 is directed upward. In other words, the eccentric bush 5 is rotated clockwise relative to the crank arm 1 in accordance with the rotation of the crank arm 1 in the direction of the arrow A. FIG. 9 illustrates the operations of the first, second and third gears 13, 15 and 14. Arrow B drawn in the first gear 13 indicates the direction of the projection 7 of the eccentric bush 5. It is apparent in view of FIG. 9 that the direction of the projection 7 of the eccentric bush is kept in a predetermined one at all times independently of the rotation of the crank arm 1, as has been described hereinbefore.

If the distance between the center of the eccentric bush 5 and the center of the pivot pin 30 is designated at L, the effective length of the link rod 9 at the state of FIG. 1 takes a value of L−1. This is because the center of the eccentric bush 5 is dislocated leftwardly of FIG. 1 by the length 1 from the center of the pin 4. FIG. 4 illustrates the operations, i.e., the usual wiping operations of the wiper blades 25 when the effective length of the link rod 9 is L−1.

As is seen from the operations shown in FIG. 9, moreover, the external gear 13 revolves together with the crank arm 1 around the drive shaft 2 while revolving about the pin 4 clockwise relative to the crank arm 1. The planetary gear 15 revolves together with the crank arm 1 around the drive shaft 2 while revolving counter-clockwise about the pin 16, whereas the center gear 14 revolves counter-clockwise about the drive shaft 2.

The operations for stopping and concealing the wiper blades 25 will be described in the following.

Figure 3:
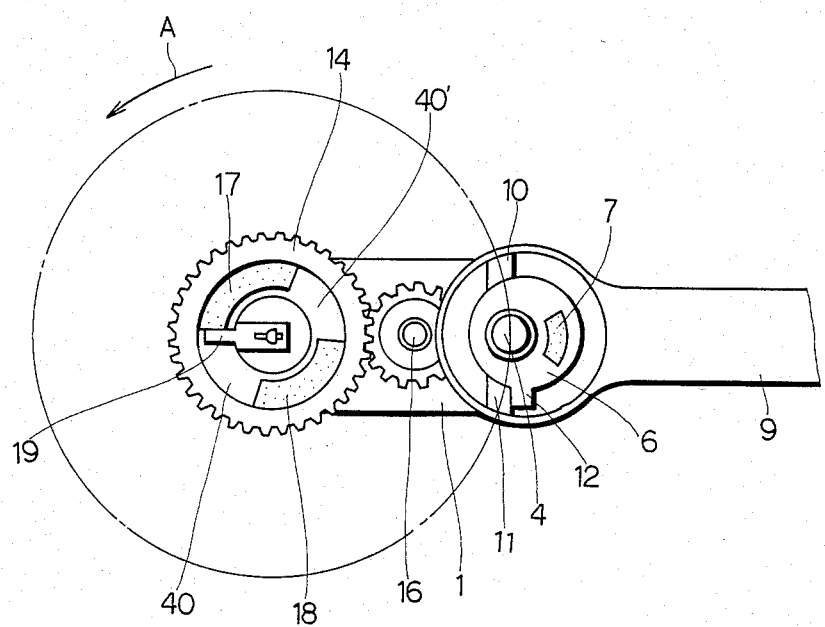
FIG. 3 is a top plan view showing the same portion of the embodiment shown in FIG. 1, in which a stopper plate 6 is rotated by 180 degrees.
Figure 10:
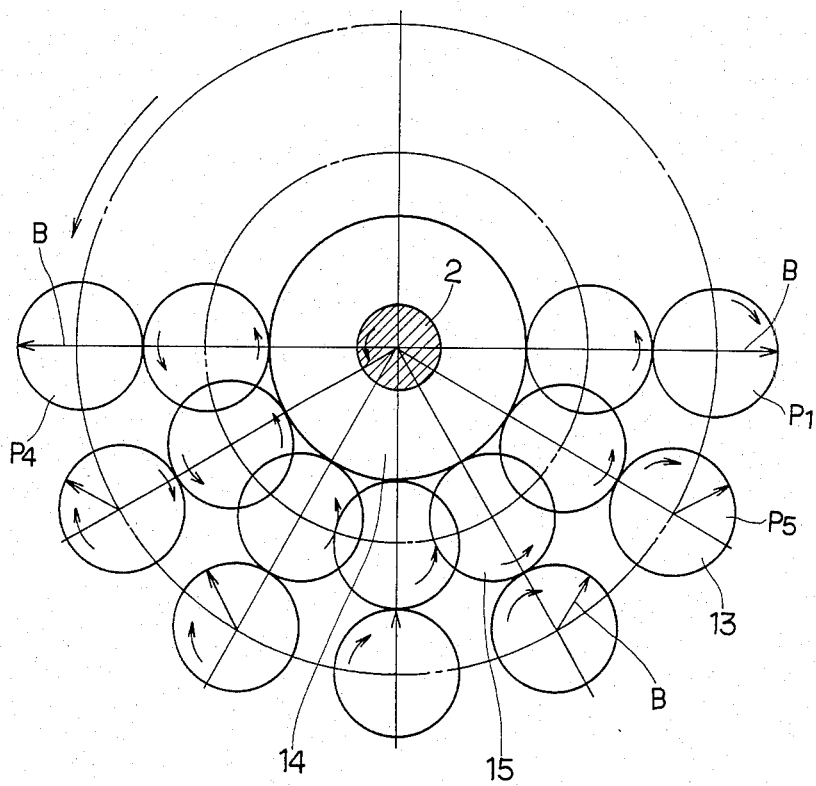

The space 40 or 40′ faces the lever 19 when the external gear 13 revolves around the drive shaft 2 from point $P_2$ to point $P_4$ of FIG. 9, whereas the stopper portion 17 or 18 faces the lever 19 when the external gear 13 is reversed from the point $P_4$ to the point $P_2$. Now, if the operating switch 62 is moved to its operation level "OFF" while the external gear 13 is revolving between the points $P_2$ and $P_4$ of FIG. 9, the movable electrode 64 comes into contact with the stationary electrodes 62e and 62f so that the electromagnetic solenoid 21 is energized. Thus, the trigger shaft 20 is moved downwardly in FIG. 2 so that the lever 19 falls into the space 40 or 40′ whereas the trigger lever 51 slides down along the cam surface 50 of the cam lever 48. As a result, the brush 45 is shifted to the position indicated at the double-dotted lines in FIG. 7. Moreover, since the crank arm 1 and the worm gear 3 are rotated together at all times, the arcuate projection 49 formed on the bottom side of the worm gear 3 is interposed between the points $P_2$ and $P_4$ of FIG. 8, while the external gear 13 is interposed between the points $P_2$ and $P_4$ of FIG. 9, so that the aforementioned shift of the brish 45 is not blocked by the protrusion 49. On the other hand, even if the brush 45 is moved by the action of the trigger lever 51, as has been described hereinbefore, the brush 45 is sliding on the conducting plate 61. As a result, the motor 75 is continuously supplied with the electric power by way of the brush 45, the stationary electrode 62d, the movable electrode 63 and the stationary electrode 62b thereby to further continue its rotations. Moreover, when the external gear 13 comes to the position $P_4$ of FIG. 9, the stopper portion 17 or 18 is brought into abutting engagement with the lever 19 thereby to block the rotations of the center gear 14. Since the crank arm 1 further continues its rotation, the eccentric bush 5 revolves clockwise about the pin 4 in accordance with the rotation of the crank arm 1, as shown in FIG. 10. When the crank arm 1 rotates 180 degrees, the eccentric bush 5 also revolves 180 degrees so that the projection 12 of the stopper plate 6 likewise revolves 180 degrees until it abuts against the stopper 11 (as shown in FIG. 3). When the external gear 13 revolves from the position $P_4$ to a position $P_1$, as has been described hereinbefore, the eccentric bush 5 revolves clockwise 180 degrees thereby to shift its center to the right as is apparent from FIG. 3. As a result, the effective length of the link rod 9 becomes L+1 so that the wiper blades 25 are concealed, as shown in FIG. 5.

The operations of the switching mechanism when the external gear 13 revolves from a position $P_5$ to the position $P_1$ will be described in the following. When the external gear 13 comes near to the position $P_5$ the brush 45 begins to contact with the opening 76 of the conducting plate 61 thereby to stop the power supplies to both the motor 75 and the electromagnetic solenoid 21. Simultaneously as the brush 45 begins to contact with that opening 76, its leading end begins to engage with the arcuate projection 49. As a result, even if the trigger shaft 51 is raised, as viewed in FIG. 2, by the interruption of the power supply to the electromagnetic solenoid 21, the leading end of the brush 45 is held in contact with the opening 76 by the engagement between the brush 45 and the projection 49. The wiper motor 75 has its rotations further continued by the action of an inertia until its rotations are promptly stopped by an electric brake which is established when the brush 45 contacts with the conducting plate 77.

The operations when the operating switch 62 has its operation level interchanged to "OFF" while the external gear 13 is located between the points $P_4$ and $P_2$ of FIG. 9, e.g., at the position of the point $P_5$ will be described in the following. When the external gear 13 is interposed between the points $P_4$ and $P_2$, as has been described hereinbefore, the lever 19 faces the stopper portion 17 or 18. As a result, even if the operating switch 62 is turned off at the position of the point $P_5$ so that the power supply to the electromagnetic solenoid 21 is started to attract the trigger shaft 20 downwardly in FIG. 2, the trigger shaft 20 is not moved downwardly because the lever 19 is in abutting contact with the upper side of the stopper portion 17 or 18. As a result, the wiper drive equipment continues its operations as they are. On the other hand, when the external gear 13 comes to the position $P_2$ from the position $P_5$, the lever 19 falls into the space 40 or 40′. And then, the trigger shaft 20 is moved downwardly so that the brush 45 is rotated by a predetermined angle by the cam action between the trigger shaft 51 and the cam lever 48. After this, the operations thus far described are repeated so that the external gear 13 revolves to the position of the point $P_1$ in which it is stopped.

Figure 11:
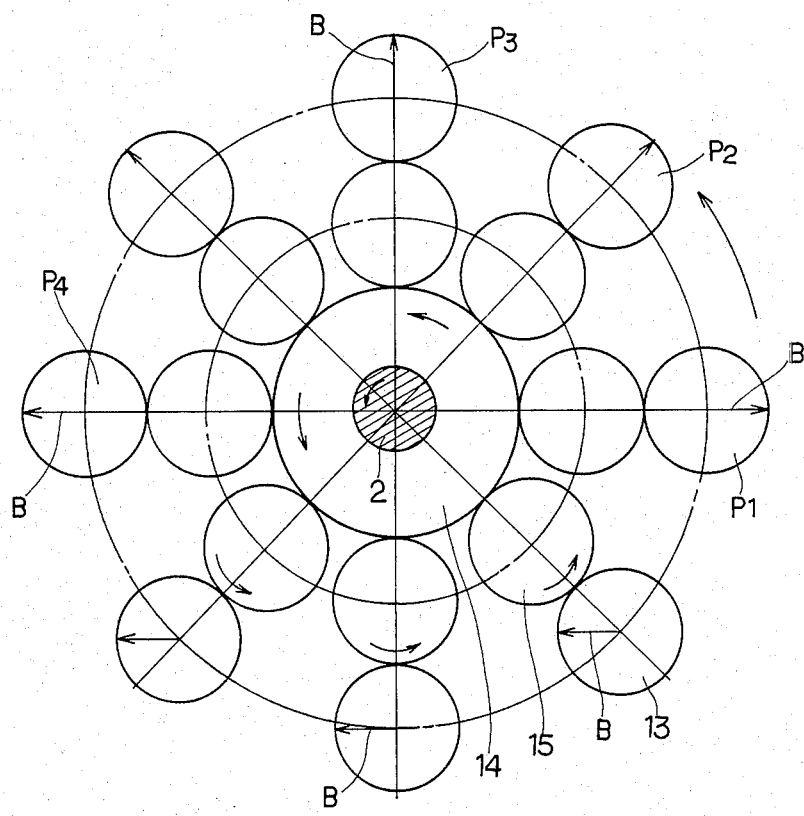

The operations when the wipers restart their wiping actions will be described in the following. When the movable electrodes 63 and 64 of the operating switch 62 are moved from the position "OFF" to the position "LOW" or "HIGH", the wiper motor 75 is supplied with the electric power by way of the stationary electrode 62c, the movable electrode 63 and the stationary electrode 62b or 62a thereby to start the rotations of the crank arm 1. Since the movable electrode 64 does not contact with the stationary electrodes 62e and 62f, the electromagnetic solenoid 21 is supplied with no electric power so that the trigger shaft 20 is raised by the action of the spring 21a. As a result, the center gear 14 is held at such a state that it can freely revolve relative to the drive shaft 2. Since there is sandwiched between the external gear 13 and the eccentric bush 5 the helical spring 71 which establishes the frictional force between the external gear 13 and the crank arm 1, as has been described hereinbefore, the external gear 13 does not revolve about the pin 4 either so long as the stopper 10 or 11 abuts against the projection 12 or so long as the revolutions of the center gear 14 are blocked. Upon the restart of the wiping operations, as has been described hereinbefore, the center gear 14 can freely revolve relative to the drive shaft 2, and the stopper 11 in abutting contact with the projection 12 at the state of FIG. 3 is carried apart from the projection 12 in accordance with the rotation of the crank arm 1. As a result, as shown in FIG. 11, the external gear 13 revolves only around the drive shaft 2 but not about the pin 4 while it is moving from the position P₁ to the position P₄. While the external gear 13 revolves around the drive shaft 2 from the position P₁ to the position P₄ in that way, the planetary gear 15 also revolves around the drive shaft 2 but not about the pin 16 whereas the center gear 14 revolves about the drive shaft 2 in the direction of arrows in FIG. 11. The direction of the eccentric bush 5 with respect to the pin 4 is designated at B in FIG. 11. When the eccentric bush 5 is moved from the position P₁ to the position P₄, its center is shifted from the right to the left of the center of the pin 4 so that the effective length of the link rod 9 is changed from L+1 to L−1. Moreover, when the external gear 13 comes to the position P₄, the projection 12 of the stopper plate 6 comes into abutting contact with the stopper portion 10 of the ring 8. As a result, when the crank arm 1 is further rotated from the position P₄ to the position P₁, the eccentric bush 5 revolves clockwise about the pin 4 so that the usual wiping operation shown in FIG. 4 is performed while holding the projection 7 of the eccentric bush 5 being oriented in the predetermined direction, as illustrated in FIG. 11.

As has been described hereinbefore, in the embodiment of the present invention, the eccentric bush 5 is always rotationally biased in a predetermined direction (i.e., in the counter-clockwise direction in FIG. 1) by the rotations of the crank arm 1 in the predetermined direction. And, this rotational biasing force is given by the wiper motor and is transmitted by both the drive shaft 2 providing the connection between the wiper motor and the eccentric bush 5 and the gear mechanism which is composed of the center gear 14, the planetary gear 15 and the external gear 13.

Moreover, the force transmission by the gear mechanism of that kind can have its rotational direction reversed by the application and release of clutch means. In the embodiment of the present invention, that clutch means is put into practice by a kind of jaw clutch which resorts to the engagement between the lever 19 and the stopper portion 17.

In an alternative, the jaw clutch may be replaced by the clutch means such as a mechanical friction clutch or an electromagnetic clutch, which is to be interposed between the center gear 14 and the housing 70 of FIG. 2 thereby to block the revolutions of the center gear 14.

In the present invention, still moreover, the drive means, which is made operative to forcibly revolve the aforementioned eccentric bush 5 in the direction opposite to the revolving direction of the pin 4 selectively (or intermittently) by the action of the clutch means 17, 19 and so on in accordance with the rotations of the drive shaft 2, is mainly constructed of the center gear 14, the planetary gear 15, the external gear 13, and the jaw clutch 17, 18 and 19, and so on. However, the drive mechanism should not be limited to the above but can be conceived to have a variety of mechanisms. For example, the rotational force of the pin 4 or the drive shaft 2 itself is selectively transmitted to the eccentric bush 5 by the action of the gear mechanism thereby to forcibly drive the eccentric bush 5. Alternatively, there is provided a center pulley which is made rotatable together with the drive shaft 2, and an external pulley integrated with the eccentric bush is connected to that center pulley through a cross belt so that the eccentric bush may be reversed through the belt by the selective rotations of the center pulley.

As has been described hereinbefore, the present invention can enjoy resultant effects that the wiper blade or blades can be concealed and that the construction can be simplified even if it employs such a system as rotates the wiper motor in one direction. As is different from the prior art, in which the transmission of the driving force is once released so as to make eccentric the output shaft of the drive motor, the present invention can enjoy another effect that the window surface can be instantly wiped clean by the operation of the wiper switch.

What is claimed is:

1. A windshield wiper driving device, comprising:
   a crank arm connected to and rotated by a drive shaft which is rotatably driven by a motor;
   a pin anchored at said crank arm;
   an eccentric bush fitted on said pin and rotatable around said pin;
   a stopper plate for rotation together with said eccentric bush;
   a ring mounted rotatably on the outer periphery of said eccentric bush and fixed to a line rod;
   stopper portions formed integrally with said ring such that a projection of said stopper plate abuts against either of said stopper portions;
   an external gear fixed to a side of said eccentric bush which is opposite the side of said stopper plate;
   a center gear rotatably fixed on a second pin, which is anchored at said crank arm, planetary gear meshing with said center gear and said external gear;
   two stopper portions formed diametrically opposite of each other in said center gear;
   a lever selectively engaging with either of said two stopper portions for stopping the rotations of said center gear; and,
   drive means for driving said lever, whereby a wiping angle of a wiper blade connected to said link rod, is changed depending on whether rotations of said center gear are blocked or not blocked by said lever.

2. A windshield wiper driving device, comprising:
   a drive shaft rotatably supported by a housing;
   a motor operatively coupled to said drive shaft for transmitting its rotational movement to said drive shaft;
   a crank arm fixed to and rotated by said drive shaft;
   a pin fixed to said crank arm;
   an eccentric bush rotatably mounted on said pin;
   a link rod coupled to said eccentric bush, whereby said link rod transmits the rotational movement of said crank arm to wiper blades as a wiping movement;
   first and second stopper portions coupled to said link rod;
   a projection formed on said eccentric bush such that said projection abuts on one of said stopper portions, said stopper portions being positioned such that an effective length of said link rod in a first state where said projection is in abutment with said first stopper portion is smallest, and the effective length of said link rod in a second state where said projection is in abutment with said second stopper portion is largest; and
   driving means for driving said eccentric bush from said first state to said second state when wiping operations of said wiper blades are to be stopped, so that the effective length of said link rod becomes largest and said wiper blades are placed in a concealed position, wherein said driving means comprises a first gear coupled to and rotated with said eccentric bush; a second gear rotatably supported on said crank arm and in engagement with said first gear; a third gear rotatably supported on said drive shaft and in engagement with said second gear; and, trigger means for stopping the rotation of said third gear with respect to said housing when wiping operations are to be stopped, such that said eccentric bush is rotated with respect to said link rod and the effective length of said link rod becomes largest.

3. A windshield wiper driving device as claimed in claim 2, wherein:
the relative gear ratios of said first, second and third gears are set at 1:1:2.

* * * * *